(12) United States Patent
Todoverto

(10) Patent No.: US 6,192,553 B1
(45) Date of Patent: Feb. 27, 2001

(54) HINGE FOR SPECTACLES

(75) Inventor: Claudio Todoverto, Valdobbiadene (IT)

(73) Assignee: Iride S.r.l., San Vito di Valdobbiadene (IT)

(*) Notice: Subject to any disclaimer, the term of this patent is extended or adjusted under 35 U.S.C. 154(b) by 0 days.

(21) Appl. No.: 09/214,907

(22) PCT Filed: Jul. 7, 1997

(86) PCT No.: PCT/EP97/03538

§ 371 Date: May 28, 1999

§ 102(e) Date: May 28, 1999

(87) PCT Pub. No.: WO98/02771

PCT Pub. Date: Jan. 22, 1998

(30) Foreign Application Priority Data

Jul. 16, 1996 (IT) .................................. B96A00009

(51) Int. Cl.$^7$ ........................................ G02C 5/22
(52) U.S. Cl. .............................................. 16/228
(58) Field of Search ................................... 16/228

(56) References Cited

PUBLICATIONS

PCT Written Opinion (PCT/EP97/03538); Apr. 21, 1998.

*Primary Examiner*—Anthony Knight
*Assistant Examiner*—Mark Williams
(74) *Attorney, Agent, or Firm*—Evenson, McKeown, Edwards & Lenahan, P.L.L.C.

(57) ABSTRACT

This innovation regards a new type of hinge for spectacles that is separable from the ordinary arms, which are therefore interchangeable and to which an adequate elasticity during the process of adjustable and forced widening is guaranteed.

The peculiar innovation of this invention is that it is endowed with lugs (A) of the front (C) of spectacles with a slot (8) for elastic means (10) which works on a slider (11) whose hollow (12) is blocked by a ring (3) of an arm (4) and pushed by said elastic means (10) against a front plate (9) of said arm (4) in order to impart the desired reaction force on said arm (4).

3 Claims, 2 Drawing Sheets

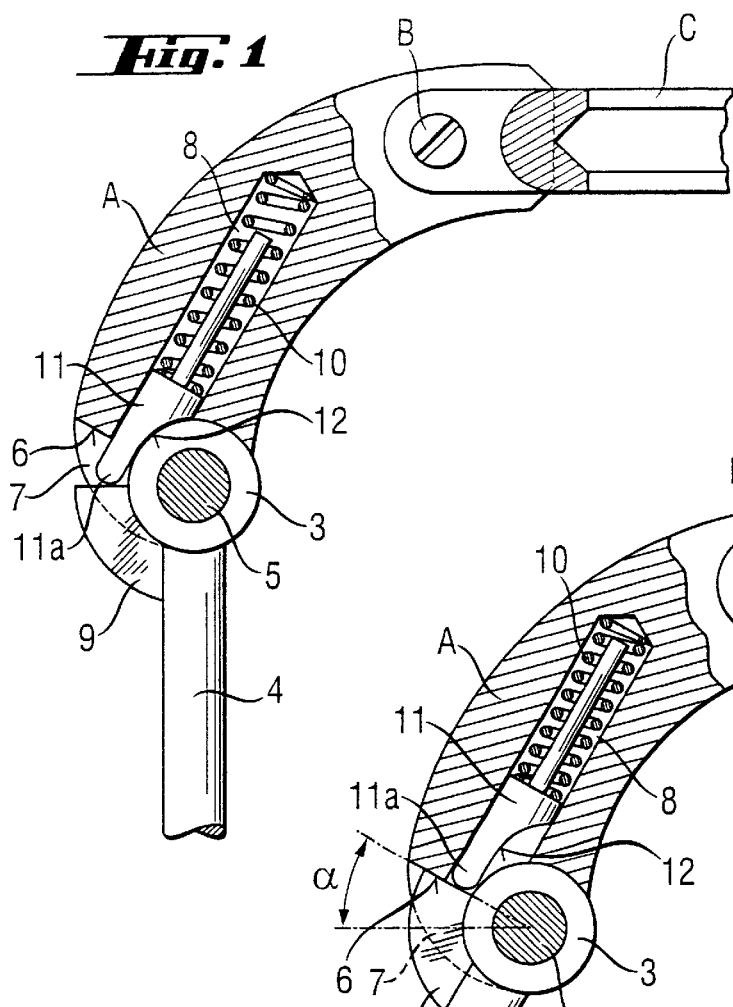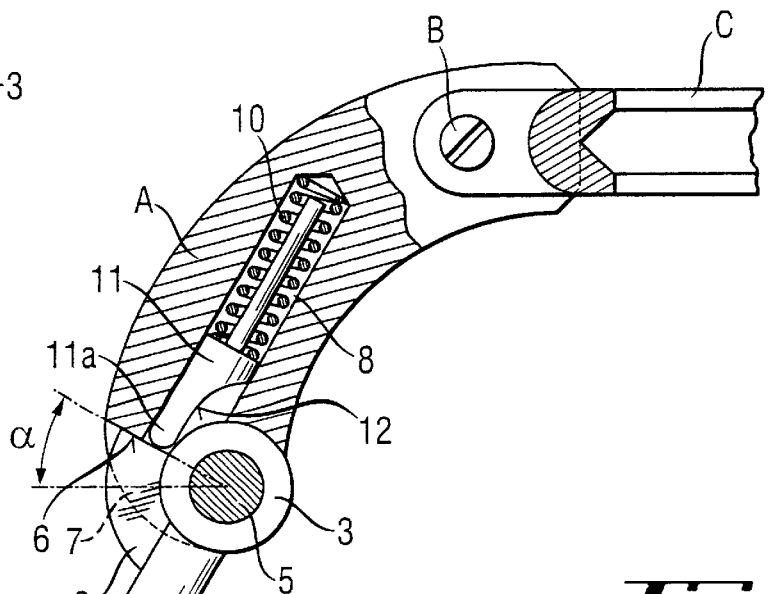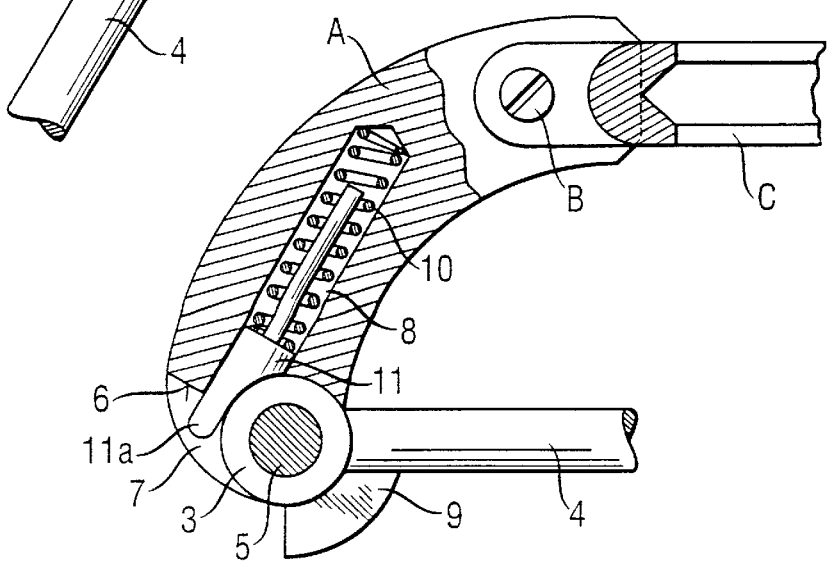

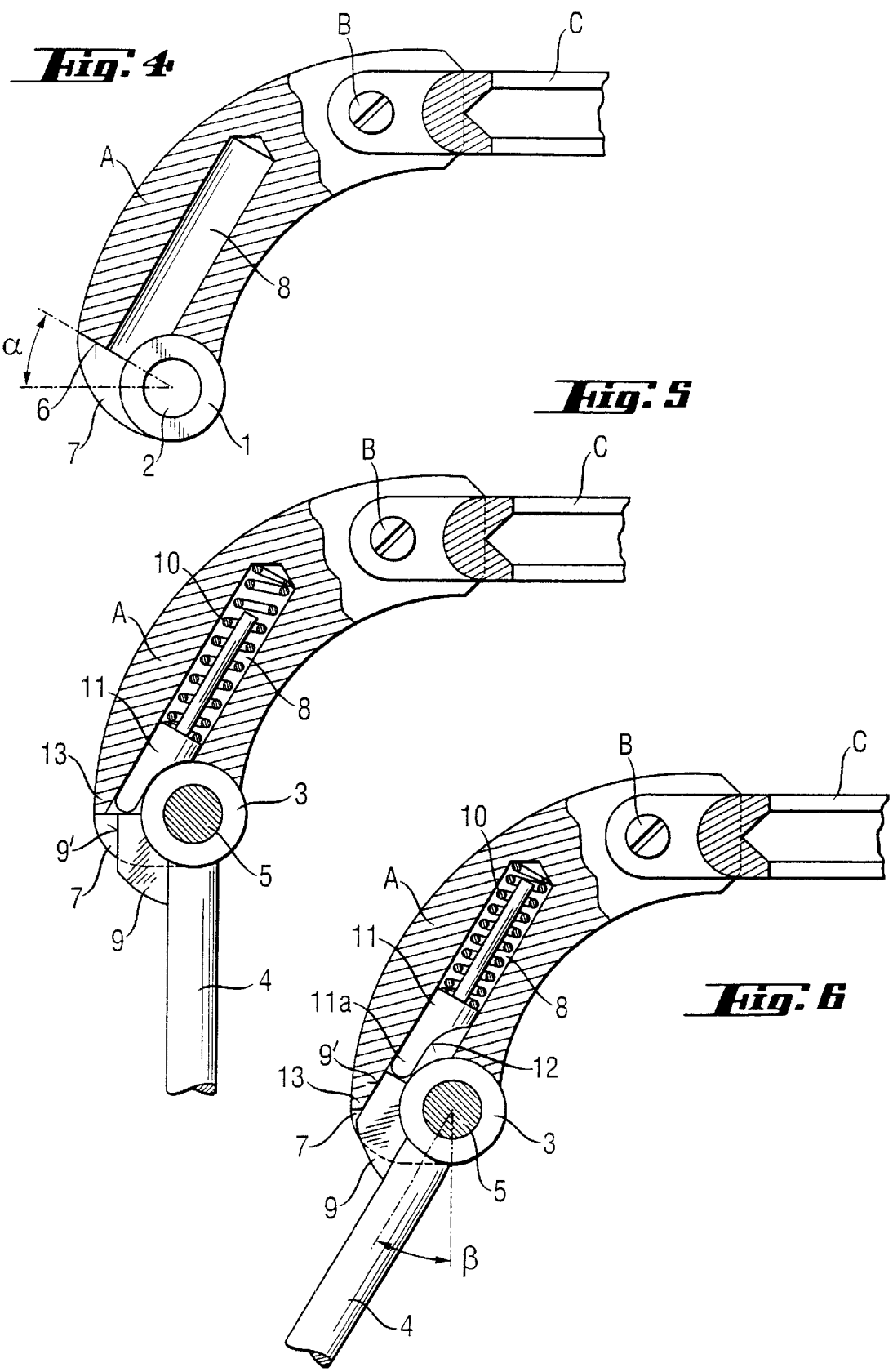

HINGE FOR SPECTACLES

This innovation regards a new hinge for spectacles fitted to utilise normal spectacle arms, which are to be hinged on the lug of the front of the glasses, in order to allow an elastical opening.

The innovative peculiarity of the invention is that it is giftet with lugs of the front of spectacles with a slot for an elastic means, acting on a slider which is confined by a ringed hinging between the front and the arm and pushed by the elastic means against the front plate of the arm to give it the desired re-entry pressure.

Well known are numberless joints, fitted to favour a moderate pressure of arms on the head, during the opening phase, when wearing a pair of spectacles. Those hinges, generically called "elastic joints", are based on the application of a gear-slider, pushed or held by an elastic means which is interposed between the extremity of the arm and its fulcrum-grommet on the front of spectacles. The numberless constructive variations of the well-known elastic joints constitute first of all a peculiarity of the specification of the builder of any spectacles model. Secondly, every constructive variation satisfies in particular a specific problem or an aesthetic or functional requirement of that spectacles model.

Almost all solutions of known elastic joints present, however, the inconvenience of having the system of elasticity applied to the extremity of the arm, therefore, in case of consumption of the elastic means, in case of breakage or wear of the device itself, the same must be completely replaced with considerable inconvenience and cost of repairing.

Moreover the application and replacement of the elasticity device on the extremity of arms generally involves considerable difficulties, surmountable only with expensive equipment which the optician not always deems justified, thus obliging the user to change the whole frame.

The main object of this invention is to realise an elastic hinge for spectacles-arms, which can supply the right pressure of arms during their opening and/or wearing of the spectacles, even if this joint is disengaged and independent from the arm itself, therefore able to consent the use or replacement with other normal arms.

Another object of the invention is to make the replacement of the joint or of its parts of elasticity independent from the remaining arm and vice versa.

A further object of the invention is to reduce the actual encumbrances required for the elasticity of the arms, incorporating this system of elasticity in the extremities of the lug of the front.

Another object of the invention is to create an extremely simple and functional elasticity means, easily applicable and of sure efficacy in the future.

These and other aims are, as a matter of fact, perfectly attained with this invention.

The subject matter of the invention is a hinge for spectacles with an elastic slider housed in a lug, in which the slider has an extremity comprising a cylindrical chamfer that abuts an eyelet of a hinge of an arm. The slider is placed inside a blind hole in the lug, together with a resilient member which exerts a force of reaction on the slider, so that in the opened position of the arm the front face of a lateral projection of the arm in the region of the hinge is in contact with the extremity of the slider. The maximum opening angle of the arm is limited by the contact of the front face of the lateral projection against an abutment face on an extremity of the lug inclined with respect to the blind hole.

A further subject matter of the invention is a hinge for spectacles with an elastic slider housed in a lug, in which the slider has an extremity comprising a cylindrical chamfer that abuts an eyelet of a hinge of an arm. The slider is placed inside a blind hole in the lug, together with a resilient member which exerts a force of reaction on the slider whereby the front face of a lateral projection of said arm in the region of the hinge is in contact with said extremity of said slider. The maximum opening angle of the arm is limited by the contact of a plane lateral surface on the lateral projection against the inner wall of the blind hole in the region of its opening.

Suitably said slider is provided with a groove fit to allow it the contact with the hinge ring of said arm, said slider being blocked by said ring.

It is preferred that said slider and its elastic means are housed in a slot created on the lug of the front of said spectacles.

The invention is further illustrated by the following description of one of its constructive solutions, only indicative and not restrictive, which is explained also with the aid of 6 schematic illustrations, reproduced in the enclosed chart.

FIG. 1 represents a blueprint, partly in section, of a lug of the front of spectacles, with the elasticity device in question applied to it, being shown with a normal widening apart of the arm;

FIG. 2 represents a blueprint, partly in section, of the same lug as in FIG. 1 with the arm at its utmost widening capacity;

FIG. 3 represents a blueprint, partly in section, of the same lug as in FIG. 1 with the arm completely closed on the front;

FIG. 4 represents a blueprint, on the equal scale and still in part section, of the lug alone associated to the front;

FIG. 5 represents a blueprint, partly in section, of the first variant of the construction solution in question, where the arm is normally wide open;

FIG. 6 represents a blueprint, partly in section, of the alternative solution shown in FIG. 5, with the arm at its utmost widening capacity.

In every drawing the same details are represented, or are meant to be represented, with the same reference number.

According to the innovation, the lug A of the front C is provided with a normal system B for the application and fixing of lenses and/or of the very lug A.

This lug A is provided with a hinging extremity with eyelets that have a hole 2 either threaded or not, so that it can be associated with the ordinary ring 3 of the traditional extremity of arm 4 by means of a rivet or hinge screw 5.

Like any normal arm's extremity, arm 4 is provided with a front plate 9 approximately three times as thick as its ring 3 and this thickness of plate 9 can amount to the normal height of arm 4.

A milling 6 of the extremity of the lug A close to the rings 1 is created by inclination α equal to the maximum forced opening angle that can be imparted to the arm 4, while outside walls 7 can be found or be applied to the joint-edges of the lug A also during the hinging process, with the screw or rivet 5.

A blind hole 8 is made on the lug A approximately with an orthogonal inclination in respect to the inclination of the wall or milling 6.

An elastic means 10 is inserted in the hole 8 so that one of its extremities hits against the bottom of the blind hole and the opposite extremity is joined to the extremity of a slider 11. This slider is endowed with a hollow or a milled surface 12 whose milling radius is approximately equal to the radius of the external encumbrance of the ring 3 applied to the arm 4.

The enclosed drawings show how, after having inserted the elastic means 10 in the hole 8 of the lug and after having introduced the insert or slider 11 by means of the application of a joint screw or rivet 5 to the ring 3 of the arm 4 adequately associated to and aligned with the rings 1 of the lug A, the same slider 11 is blocked by the ring 3 against which it hits with its hollow or milled wall 12.

The slider 11 is provided with an extremity 11a which would normally slide out of the housing slot 8 in consequence of the pressure exercised by the elastic means 10. The maximum value of the protrusion of the extremity 11a is given by the point of contact of its hollow wall 12 with the ring 3 of the arm 4, as can be seen from FIGS. 1 and 3.

With the normal widening of the spectacles, as shown in FIG. 1, the front plate or side's extremity 9 lightly touches the extremity 11a of the slider 11.

By putting an adequate strain on it, it is possible to widen the arm 4 further apart until the front plate 9 meets the inclined wall 6 which thus delimits the widest opening of the arm 4.

It is evident that because of the opening forced upon the arm 4 and the following rotation of the front plate 9, the front plate 9 itself pushes the extremity 11a and forces it to re-enter in its slot, thus compressing the elastic means 10, as shown in FIG. 2.

The thrust reaction of the elastic means 10 on the arm 4 is exerting a force on the mobile slider and on the front plate 9 of the arm 4 in order to guarantee to the wide apart arm 4 the adequate pressure which provides the best conditions for wearing glasses.

The same reaction of the elastic means 10 compressed by the slider 11 eases the setting back of the arm 4 when the glasses are not being worn. Thus the type of hinge obtained guarantees even, though making use of ordinary and common ear-rests, the best conditions for a most favourable elasticity with a simple and easily applicable device devoid of encumbrances both on the arms and on the front of the spectacles, with the possibility of exchanging the sides and/or the very elastic parts, according to the different aims.

The elastic joint so far described and illustrated by FIGS. 1 to 4 can also be created in other constructive forms.

FIGS. 5 and 6 illustrate an alternative constructive solution, also based on the application of a slider 11 and of an elastic means in a slot 8 inside the lug A so that it hits against the front plate 9 of the arm 4.

But the constructive solution of FIGS. 5 and 6 is different from the previous one in that the normal front plate 9 of the arm 4 presents a head-milling 9' which guarantees in any case the contact with the extremity 11a of the slider 11, whereas the extremity of the lug A has no inclined wall 6 but it offers a suitable housing 13 on the head wall, in order to contain the front plate in all its width or/and height obtained at the end of the drilling area of the slot 8. The farthest widening β apart of the arm 4 is, however, still guaranteed by the contact of the milled wall 9' of the front plate 9 with the head wall 13 of the lug A, as shown in FIG. 6.

This and other similar changes or adaptations are meant, however, to be part of the hinge that is to be protected.

What is claimed is:

1. A hinge for spectacles, said hinge having a slider housed in a lug, said slider having an extremity comprising a cylindrical chamfer that abuts an eyelet of a hinge of an arm that is connected to the hinge, said slider being placed inside a blind hole in said lug, together with a resilient member which exerts a force of reaction on said slider, whereby in an opened position of the arm a front face of a lateral projection of said arm in a region of the hinge contacts said extremity of said slider, wherein a maximum opening angle of said arm is limited by contact of said front face of said lateral projection against an abutment face on an extremity of said lug, inclined with respect to the blind hole.

2. Hinge for spectacles, said hinge having a slider housed in a lug, said slider having a reduced extremity comprising a cylindrical chamfer that abuts an eyelet of a hinge of an arm that is connected to the hinge, said slider being placed inside a blind hole in said lug, together with a resilient member which exerts a force of reaction on said slider, whereby a front face of a lateral projection of said arm in the region of the hinge contacts said reduced extremity of said slider, wherein a maximum opening angle of said arm is limited by contact of a plane lateral surface on said lateral projection against an inner wall of the blind hole in a region of its opening.

3. A hinged glasses frame comprising:

a front portion;

at least one arm;

a pivotable hinge joining an extremity of said at least one arm with said front portion, said hinge having a rotatable barrel for permitting angular rotation of said arm relative to said front portion;

a lug mounted on said front portion and having a longitudinal bore therein, opening through an abutment face of said lug, toward said rotatable barrel;

a slider disposed in said longitudinal bore, with a resilient member biasing said slider in a direction of an opening of said bore and toward said rotatable barrel, said slider having an extremity which has cylindrical chamfer therein and which projects from said opening of said bore in an extended position of said slider, with said chamfer bearing against said barrel;

a lateral projection disposed on said arm and having a front face which is adapted to contact said extremity of said slider, pushing said extremity into said bore, counter to biasing of said resilient member, in an opened position of said hinge; and wherein said front face of said lateral projection is disposed to butt against said abutment face of said lug, defining a maximum opening of said hinge.

* * * * *